US010026540B2

(12) United States Patent
Bodenstedt et al.

(10) Patent No.: US 10,026,540 B2
(45) Date of Patent: Jul. 17, 2018

(54) MAGNETIC COMPONENTS AND METHODS FOR MAKING SAME

(71) Applicant: VISHAY DALE ELECTRONICS, LLC, Columbus, NE (US)

(72) Inventors: Steven R. Bodenstedt, Yankton, SD (US); Brian J. Jensen, Yankton, SD (US)

(73) Assignee: VISHAY DALE ELECTRONICS, LLC, Columbus, NE (US)

( * ) Notice: Subject to any disclaimer, the term of this patent is extended or adjusted under 35 U.S.C. 154(b) by 307 days.

(21) Appl. No.: 14/242,982

(22) Filed: Apr. 2, 2014

(65) Prior Publication Data

US 2015/0287519 A1     Oct. 8, 2015

(51) Int. Cl.
| | |
|---|---|
| *H01F 27/28* | (2006.01) |
| *B23K 26/38* | (2014.01) |
| *H01F 41/06* | (2016.01) |
| *H01F 41/04* | (2006.01) |

(52) U.S. Cl.
CPC ......... *H01F 27/2847* (2013.01); *B23K 26/38* (2013.01); *H01F 41/04* (2013.01); *H01F 41/06* (2013.01); *Y10T 29/4902* (2015.01)

(58) Field of Classification Search
CPC ...... H01F 41/04; H01F 41/06; H01F 27/2847; B23K 26/38; B23K 26/702; Y10T 29/4902
USPC ............. 219/121.72, 121 L, 121 LM, 121 P; 269/96, 53, 54, 321 A, 54.4; 248/176, 248/177, 178, 188.2, 188.4, 23, 174; 29/602.1
See application file for complete search history.

(56) References Cited

U.S. PATENT DOCUMENTS

| | | | | |
|---|---|---|---|---|
| 4,039,799 A | * | 8/1977 | Stumpf ................ | B23K 26/702 219/121.67 |
| 4,847,985 A | * | 7/1989 | Aubert ................ | G01R 33/385 29/602.1 |
| 4,973,819 A | * | 11/1990 | Thatcher ................ | B23K 26/10 219/121.63 |
| 5,124,652 A | * | 6/1992 | Aubert ................ | G01R 33/385 324/318 |
| 5,190,204 A | * | 3/1993 | Jack ....................... | B23K 26/26 219/121.63 |
| 5,331,872 A | * | 7/1994 | Fuchigami ............... | B26D 5/02 83/171 |
| 5,454,287 A | * | 10/1995 | Fuchigami ............... | B26D 5/02 219/221 |

(Continued)

FOREIGN PATENT DOCUMENTS

JP          H06 005452 A1     1/1994

OTHER PUBLICATIONS

Dr. Rüdiger Paschotta, Encyclopedia of Laser Physics and Technology, "High-power Fiber Lasers and Amplifiers" (10 pages) © Dr. Rüdiger Paschotta, RP Photonics Consulting GmbH http://www.rp-photonics.com/high_power_fiber_lasers_and_amplifiers.html.

(Continued)

*Primary Examiner* — Eric Stapleton
(74) *Attorney, Agent, or Firm* — Volpe and Koenig, P.C.

(57) ABSTRACT

Magnetic components and a method for making them are described. A conducting material may be cut using a high power laser such as, but not limited to, a rare-earth fiber laser such as a Ytterbium fiber laser. Alternatively, a conducting material may be cut using an abrasive water jet. The magnetic components may be planar.

22 Claims, 5 Drawing Sheets

(56) References Cited

U.S. PATENT DOCUMENTS

| | | | | |
|---|---|---|---|---|
| 5,634,388 | A * | 6/1997 | Fuchigami | B26F 1/3813 219/221 |
| 5,915,998 | A * | 6/1999 | Stidham | H01R 4/36 439/521 |
| 6,222,155 | B1 * | 4/2001 | Blackmon | B23K 7/002 219/121.39 |
| 6,310,317 | B1 * | 10/2001 | Remue | B23K 26/10 219/121.67 |
| 6,336,980 | B1 * | 1/2002 | Benedetti | B21B 1/18 148/653 |
| 6,483,219 | B2 * | 11/2002 | Nikolic | H02K 31/00 310/178 |
| 6,588,738 | B1 * | 7/2003 | Sukuvaara | B23K 26/06 269/293 |
| 6,615,481 | B1 | 9/2003 | LaPlante et al. | |
| 6,783,612 | B2 * | 8/2004 | Benedetti | B21B 1/18 148/653 |
| 6,815,637 | B2 * | 11/2004 | Bell | B23K 26/10 219/121.61 |
| 7,047,857 | B2 * | 5/2006 | Adkins | B23Q 1/012 83/177 |
| 7,126,082 | B2 * | 10/2006 | Lundberg | B23K 26/10 219/121.62 |
| 7,238,914 | B2 * | 7/2007 | Kawakita | B23K 26/06 219/121.74 |
| 7,342,749 | B2 * | 3/2008 | Hashi | B23H 7/02 360/235.4 |
| 8,013,272 | B2 * | 9/2011 | Hayashi | G03G 15/6582 219/121.67 |
| 8,253,064 | B2 * | 8/2012 | Beck | B23K 26/0846 219/121.67 |
| 8,367,969 | B2 * | 2/2013 | Caristan | B23K 26/38 219/121.67 |
| 8,441,331 | B2 * | 5/2013 | Maple | H01F 27/2847 336/198 |
| 8,471,175 | B2 * | 6/2013 | Finn | B23K 26/0838 219/121.67 |
| 8,490,268 | B2 * | 7/2013 | Pluss | B23K 26/0838 219/121.67 |
| 8,841,578 | B2 * | 9/2014 | Finn | B23K 26/0838 219/121.67 |
| 2001/0019298 | A1 * | 9/2001 | Person | H01F 17/0006 336/200 |
| 2002/0135256 | A1 * | 9/2002 | Nikolic | H02K 31/00 310/178 |
| 2003/0084974 | A1 * | 5/2003 | Benedetti | B21B 1/18 148/663 |
| 2004/0099111 | A1 * | 5/2004 | Adkins | B23Q 1/012 83/98 |
| 2004/0108305 | A1 * | 6/2004 | Harnisch | B23K 26/0846 219/121.72 |
| 2004/0145443 | A1 * | 7/2004 | Shoji | H01F 17/0033 336/200 |
| 2004/0174240 | A1 * | 9/2004 | Suzui | H01F 41/063 336/150 |
| 2004/0194293 | A1 * | 10/2004 | Begg | G01R 33/3875 29/606 |
| 2005/0122200 | A1 * | 6/2005 | Shafer | H01F 17/04 336/200 |
| 2005/0239220 | A1 * | 10/2005 | Dauwalter | G01C 19/24 438/3 |
| 2006/0012918 | A1 * | 1/2006 | Hashi | B23H 7/02 360/234.5 |
| 2006/0090622 | A1 * | 5/2006 | Adkins | B23Q 1/012 83/549 |
| 2006/0118529 | A1 * | 6/2006 | Aoki | B23K 26/0846 219/121.67 |
| 2010/0164665 | A1 * | 7/2010 | Sevakivi | H01F 5/00 336/61 |
| 2011/0024051 | A1 * | 2/2011 | Sanford | B25J 9/1687 156/355 |
| 2014/0209574 | A1 * | 7/2014 | Walsh | B23K 37/0235 219/121.39 |
| 2014/0374390 | A1 * | 12/2014 | Beransky | B23K 37/0235 219/121.7 |

OTHER PUBLICATIONS

Nov. 28, 2017 Search Report issued in European Application No. 15773134.0.

* cited by examiner

MAGNETIC COMPONENTS AND METHODS FOR MAKING SAME

FIELD OF INVENTION

This application is directed to electronic components and, more specifically, to magnetic components and the manufacture thereof.

BACKGROUND

There is increasing demand for magnetic components, such as inductors and transformers, with improvements such as decreased weight, height, or volume for given values of electrical parameters, such as inductance, AC and DC resistance, and quality factor and having lower losses, lower leakage inductance, and better balancing of interwinding capacitance and leakage inductance. One technology where this demand is significant is electric and hybrid automobiles.

Magnetic components have traditionally been made by winding wires, machining, and metal cutting. Metal cutting techniques that have been used include stamping, chemical etching, plasma cutting, milling, and electrical discharge machining (EDM). Each of these cutting methods has at least one of the following disadvantages when considered for mass production of improved components as described above: (1) high retooling costs following design changes; (2) relatively large kerf (the width of material removed during cutting); (3) inability to cut relatively thick metal; (4) relatively slow cutting speeds; (5) tool wear; (6) thermal and mechanical stress of the conductor; and (7) need for highly trained machine operators.

SUMMARY

Accordingly, there is a need for a magnetic component having improved electrical characteristics that is efficiently manufactured. Magnetic components and a method for making them are described. One method embodiment involves cutting a conducting material using a high power laser such as, but not limited to, a rare-earth fiber laser such as a Ytterbium fiber laser. Another method embodiment involves cutting a conducting material using an abrasive water jet. The magnetic components may be planar.

DETAILED DESCRIPTION OF THE PREFERRED EMBODIMENTS

Planar magnetic components may be utilized to meet the demands described above. In the past, planar magnetic components have been more expensive to produce than comparable traditional wire wound components. However, via the present invention, it has been found that the production costs of planar magnetic components can be significantly reduced using methods such as laser cutting and abrasive water-jet cutting.

In water-jet cutting, a high pressure stream of water is used to cut the material. Water is forced through a nozzle at high pressure to create a cutting stream with a diameter as small as 0.25 mm (0.01 inches) or smaller. In abrasive water-jet cutting, small particles of a relatively hard, abrasive material, such as garnet, are introduced into the water stream. The stream accelerates the particles and the particles do most of the eroding of the material being cut.

Figure 3:
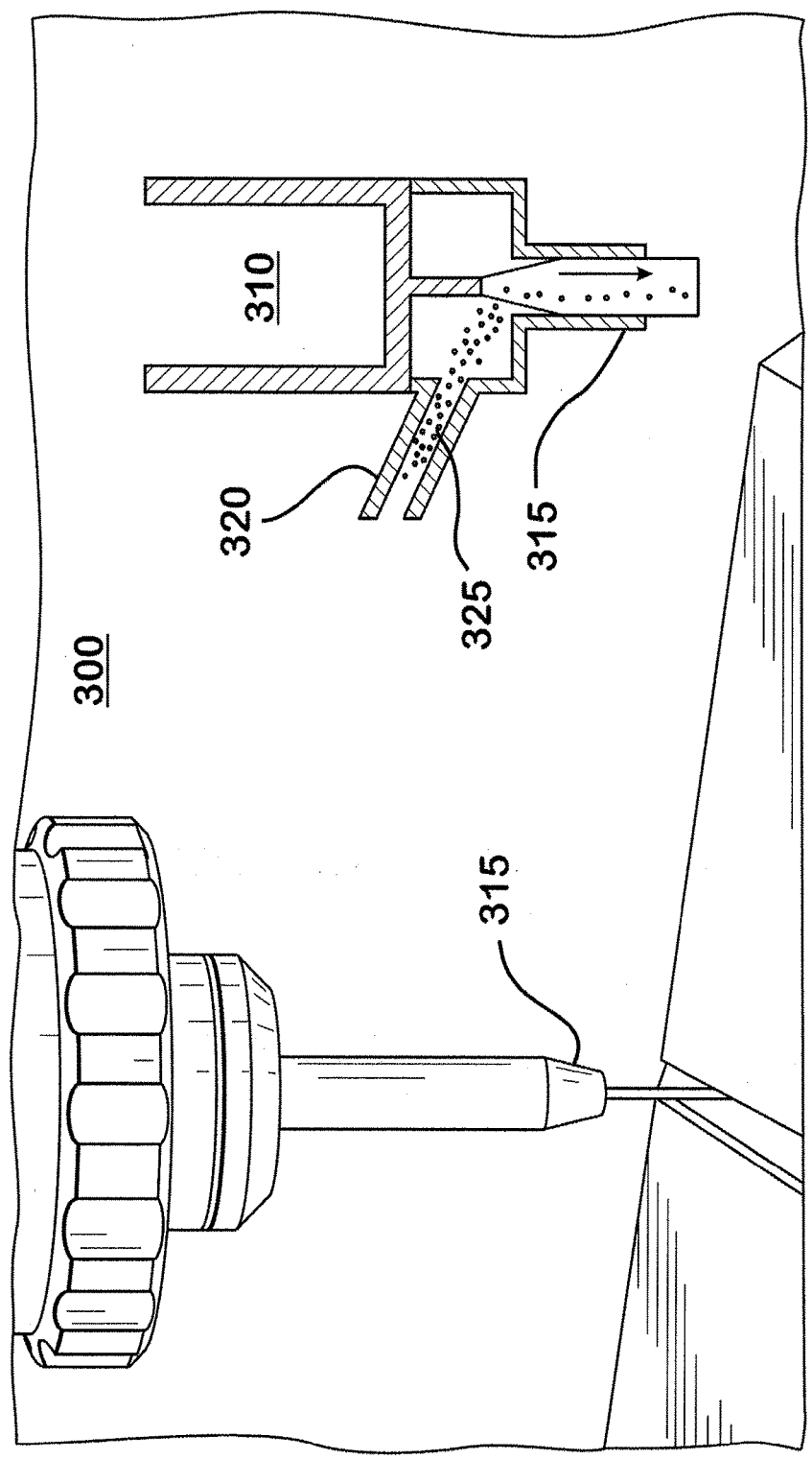
FIG. 3 shows an example of an abrasive water-jet cutting apparatus.

FIG. 3 shows an example of an abrasive water-jet cutting apparatus 300. Water in a reservoir 310 is pressurized and forced through a nozzle 315 to form a cutting stream. Abrasive particles 325 may be introduced through a side tube 320.

Laser cutting and abrasive water-jet cutting may each provide faster cutting speeds for magnetic components than previous methods. A sheet of an electrically conducting material, such as a metal, with a thickness of about 2 millimeters (0.08 inches) or less can be cut more rapidly with laser cutting than with water-jet cutting. For thicker materials, abrasive water-jet cutting provides higher cutting speeds. At the same time, throughput for water-jet cutting can be increased by cutting a stack of several sheets together in a single pass. Experimental results are summarized in Table 1.

TABLE 1

| Abrasive Water-Jet Cutting | | Laser Cutting | |
|---|---|---|---|
| Material Thickness, in. (mm) | Feasible Cutting Speed in./min. (cm./min.) | Material Thickness, in. (mm) | Feasible Cutting Speed in./min. (cm./min.) |
| 0.05 (1.3) | 90 (229) | 0.05 (1.3) | 433 (1100) |
|  |  | 0.08 (2.0) | 118 (300) |
|  |  | 0.09 (2.3) | 79 (201) |
|  |  | 0.157 (4.0) | 23 (58) |
| 0.25 (6.3) | 90 (229) | 0.248 (6.3) | 3.9 (10) |

High power lasers may be used to cut electrically conducting materials, such as metals, including planar electrically conducting materials, to form planar magnetic components, such as coils, to be used in magnetic devices, such as inductors and transformers. Such coils can be used by themselves as inductors, for example. Alternatively, several such coils can be joined to one another to form devices with multiple windings and layers. Joining of coils may be accomplished by such techniques as, for example, stacking, folding, welding, brazing, or soldering. The same laser used to cut the coils may be used to join them. Layers and turns can be insulated from each other by applying insulation in sheet form or liquid form, or by molding, by way of example.

Until recently, however, lasers were not capable of cutting relatively thick pieces of relatively highly reflective materials, such as copper. This was at least because they could not support high levels of continuous output power, proper cooling at peak power output, and required higher optical beam quality.

One example of a laser that is capable of cutting relatively thick and highly reflective materials at relatively high cutting speeds with relatively narrow kerf (width of the cut) is a rare-earth fiber laser such as a Ytterbium fiber laser. Such lasers are manufactured by such companies as Hypertherm, JK Lasers, Laser Star, Rofin, Coherent, IPG Photonic, and Trumpf. Such lasers may emit light as pulses in the near infrared range (wavelengths around 1 micrometer) with average continuous power in the kilowatt range. In contrast to other cutting methods, such rare-earth fiber lasers may be used to cut shapes out of relatively highly reflective metal, such as copper or alloys of copper, at relatively high cutting speeds (see Table 1). For metals, as well as other materials, high reflectivity of light in the optical and infrared range is often accompanied by high electrical conductivity at frequencies ranging from DC through at least the microwave range. (High reflectivity and high electrical conductivity in metals have a common origin, namely the fact that metals contain a high concentration of highly mobile ("free") electrons.) For this reason, cutting methods using high power infrared lasers, such as those described above, may be particularly advantageous when used to cut electrical components.

Manufacturers of water-jet cutting equipment include OMAX and Flow.

With these high reflectivity and high thickness conditions, a kerf as narrow as 250 micrometers (0.010 inch) on copper is obtainable using these new laser cutting methods, although this dimension is not limited by current technology, and smaller kerfs may be obtained. The kerf is essentially the same size as the beam diameter over the region of focus (beam waist) and may be varied by varying the beam focusing optics.

Using such novel methods, small, compact and lightweight magnetic devices may be fabricated faster and less expensively than with previous methods. Factors contributing to this increased speed and cost reduction include less material waste, greatly increased cutting speed, and shorter time between design and manufacturing. Unavoidable retooling costs in other methods, such as the making of new stamping dies, are virtually eliminated.

A kerf as small as 0.015 inch may be obtained using abrasive water-jet cutting, although this dimension is not limited by current technology, and smaller kerfs may be obtained. The kerf is very nearly equal to the diameter of the water stream, determined largely by the geometry of a nozzle, and a cut with this kerf can be obtained in a single pass. As with laser cutting, abrasive water-jet cutting virtually eliminates retooling costs. The diameter of the water stream, and the resulting kerf, may be varied by using nozzles of different geometries.

The smaller kerfs obtainable with laser cutting and water-jet cutting provide numerous advantages. Reduced kerfs allow for a greater volume of conductive material inside the core of a magnetic component. The higher conducting volume results in less resistance in the windings, less winding loss, less watt density in the winding core, and less temperature rise. Lower resistance also leads to an increased Quality factor Q. A smaller kerf may result in more turns per layer in a given volume, which results in increased inductance as well as increased possible turn ratios in transformers. Other advantages to a smaller kerf include optimized leakage inductance and capacitance.

These advantages of a smaller kerf obtainable with laser and water-jet cutting may be seen quantitatively from the following equations. For an inductor, the inductance L is given by:

$$L = T^2 * A_1 \quad \text{Equation (1)}$$

where T is the number of turns and $A_1$ is a constant for a given structure (core constant) having units of nanohenries (nH) per square turns. The increased number of turns available with reduced kerf increases the inductance proportional to the square of the number of turns. The resistance R of conducting material is given by Equation (2):

$$R = \rho * \left(\frac{L}{A}\right) \quad \text{Equation (2)}$$

where ρ is the resistivity of the conducting material, L its length, and A its cross-sectional area. The larger volume of conducting material obtainable with reduced kerf (such as increased width resulting in increased cross-sectional area A) is thus seen to reduce the resistance R.

Increase in quality factor Q with decreasing resistance may be seen from Equation (3):

$$Q = \frac{\omega L}{R_{dc} + R_{ac} + R_{cd}} \quad \text{Equation (3)}$$

where ω is the angular frequency of operation, L is inductance, $R_{dc}$ is DC winding resistance, $R_{ac}$ is resistance due to core loss, and $R_{cd}$ is due to dielectric losses in winding.

Decreased resistance also results in decreased power losses, decreased Watt density (energy dissipated in a given volume) and, as a result, reduced temperature rise. These can be seen from Equations (4)-(6):

Power Losses: Because resistance is less, power losses due to inefficiencies are reduced.

$$Pcu = I_p^2 R_p \text{(Primary)} \quad \text{Equation (4)}$$

$$Pcu = I_s^2 R_s \text{(Secondary)} \quad \text{Equation (5)}$$

$$P_{core} = P_V * V_e * 1000 \quad \text{Equation (6)}$$

where:
Pcu=Copper power loss (watts)
$P_{core}$=Core Power Loss (watts)
$I_p$=Primary Current (Amps)
$I_s$=Secondary Current (Amps)
$R_p$=Primary Resistance (Ω)
$R_s$=Secondary Resistance (Ω)
$P_V$=Power Loss Core (kW/m³)
$V_e$=Core Volume (m³)

Watt Density: When power losses are reduced, watt density is also decreased, as shown by Equations (7) and (8).

$$\lambda_{Core} = \frac{Pcu(\text{Primary}) + Pcu(\text{Secondary}) + Pfe(\text{Core})}{A(\text{Core})} \quad \text{Equation (7)}$$

$$\lambda_{Transformer} = \frac{Pcu(\text{Primary}) + Pcu(\text{Secondary}) + Pfe(\text{Core})}{A(\text{Transformer})} \quad \text{Equation (8)}$$

where:
λ=Watt Density (watts/cm²)
Pcu=Copper power loss (watts)
Pfe=Core power loss (watts)
A=Surface Area (cm²)

Temperature Rise: When the watt density is decreased in both the core and transformer, the respective temperature rise is decreased, as shown by Equation (9).

$$\Delta T = 400 * \lambda^{0.826} \quad \text{Equation (9)}$$

where:
ΔT=Temperature rise assuming ambient cooling (° C.)
λ=Watt Density (watts/cm²)

Due to the smaller kerf size as well as additional volume of conductor, magnetics manufactured with a water-jet or laser system have more flexibility in the number of turns, number of layers, as well as the mean length per turn on any given design. This fact allows the designs to better optimize for leakage inductance and capacitance, as shown by Equations (10)-(14).

Leakage Inductance $$L_l = 4\pi 10^{-4} \frac{N^2 l_w}{M^2 Y}\left(\frac{\Sigma X}{3} + \Sigma x_\Delta\right) \qquad \text{Equation (10)}$$

where:
$L_l$=Leakage Inductance (μH)
N=Number of turns on winding
M=Number of Section Interfaces
$l_w$=Mean turn length (mm)
X=Overall winding dimension perpendicular to the section interfaces (mm)
Y=Winding dimension parallel to the section interfaces (mm)
ΣX=Sum of all section dimensions perpendicular to the section interfaces (mm)
ΣXΔ=Sum of all inter-section layer thicknesses (mm)

Capacitance $$C_L = C_p + n^2 C_s \qquad \text{Equation (11)}$$

$$C_p = \frac{4C_c}{3N_L}\left(1 - \frac{1}{N_L}\right) \qquad \text{Equation (12)}$$

$$C_s = \frac{4C_c}{3N_L}\left(1 - \frac{1}{N_L}\right) \qquad \text{Equation (13)}$$

$$C_c = \frac{0.089 * MLT * a * e}{d} \qquad \text{Equation (14)}$$

where:
$C_L$=Lumped Capacitance (pF)
$C_p$=Primary Capacitance (pF)
$C_s$=Secondary Capacitance (pF)
$C_c$=Capacitance between first winding layer and core (pF)
n=turns ratio, the number of primary turns divided by the number of secondary turns
$N_L$=Number of Layers of given winding
MLT=Mean length per turn for the whole coil (cm)
a=Winding width (cm)
e=dielectric constant of insulation
d=insulation thickness (cm)

In an embodiment, a planar sheet of metal is fixed to a table that can be translated through precisely controlled distances in at least two dimensions. A laser output is fixed in position. A computer-generated design is stored in a computer that drives the position of the table. As the table is translated through the desired designed pattern, the laser emits pulses that cut the metal into the desired shape. Alternatively, the table and sheet may be stationary and the laser light or the laser itself may be moved based on the stored computer-generated design.

Similarly, with abrasive water-jet cutting, either a table can be translated past a stationary nozzle or a nozzle can be moved over a stationary table. With water jet cutting a single planar metal sheet or a stack of metal sheets can be cut to form the desired shape.

Figure 5:
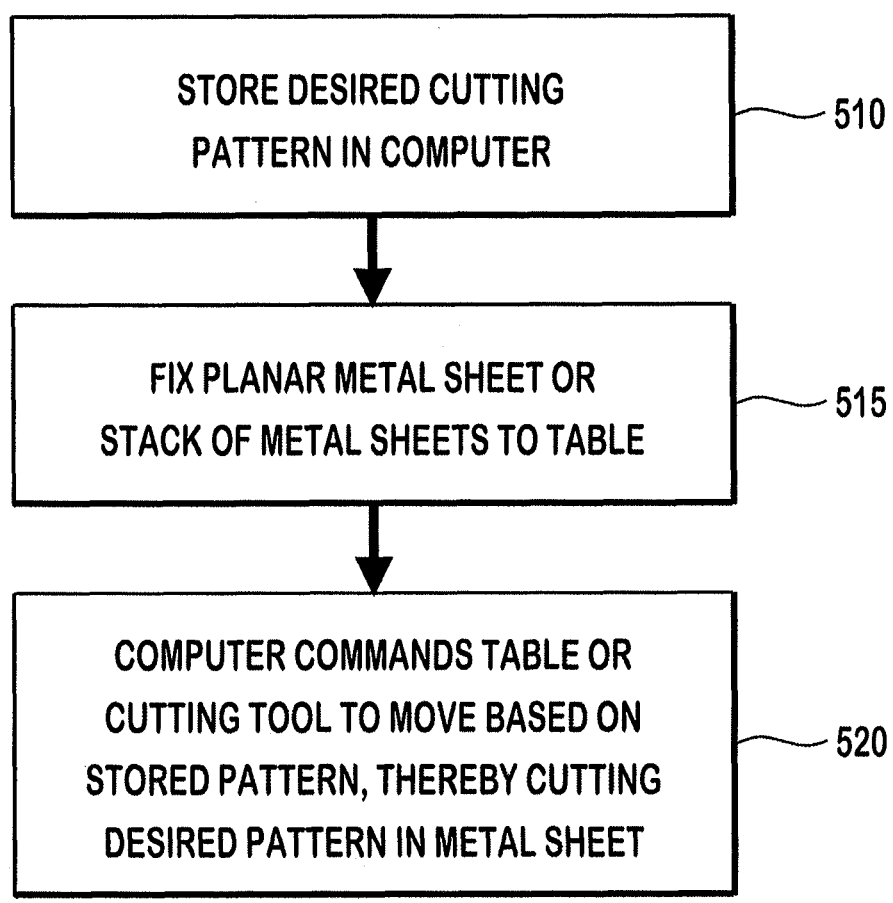
FIG. 5 shows an example of a method of cutting magnetic components.

FIG. 5 shows an embodiment of a method 500 of fabricating a magnetic component. A desired cutting pattern is stored in a computer that is configured to move a table or a cutting tool 510. A planar metal sheet or stack of sheets is fixed to the table 515. The computer sends commands to the table or cutting tool to move during cutting, based on the stored pattern 520. In this way, the desired pattern is cut in the metal sheet or stack of sheets.

Figure 1A:
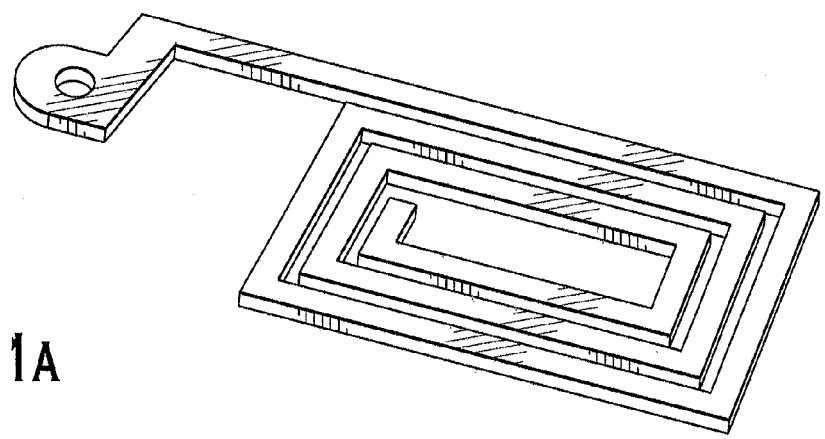
FIGS. 1A and 1B are two views of an example magnetic component fabricated using a laser cutting method or a water-jet cutting method.
Figure 1B:
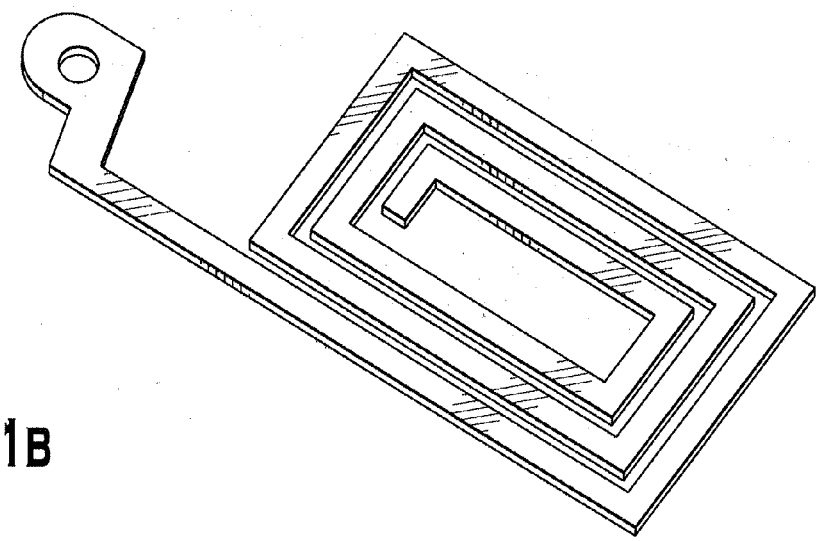

FIGS. 1A and 1B respectively show a top view and a bottom view of a coil that has been cut from a sheet of electrically conducting metal using a laser cutting method such as that described above. The coil has the form of a planar spiral with three turns. The coil has a rectangular shape in the plane of the spiral. Such a coil may be used either alone or joined with other coils as described above. For example, two coils made in this manner may be used as primary and secondary coils in a planar transformer. The particular coil shown in FIGS. 1A and 1B is only one example of the nearly unlimited variety of coil geometries that may be fabricated using a laser cutting technique as described above. Therefore, none of the coil characteristics shown in any figure are to be construed as limiting. In particular, the dimensions, planarity, shape, and number of turns of the coils shown in all figures are not to be construed as limiting.

Figure 4:
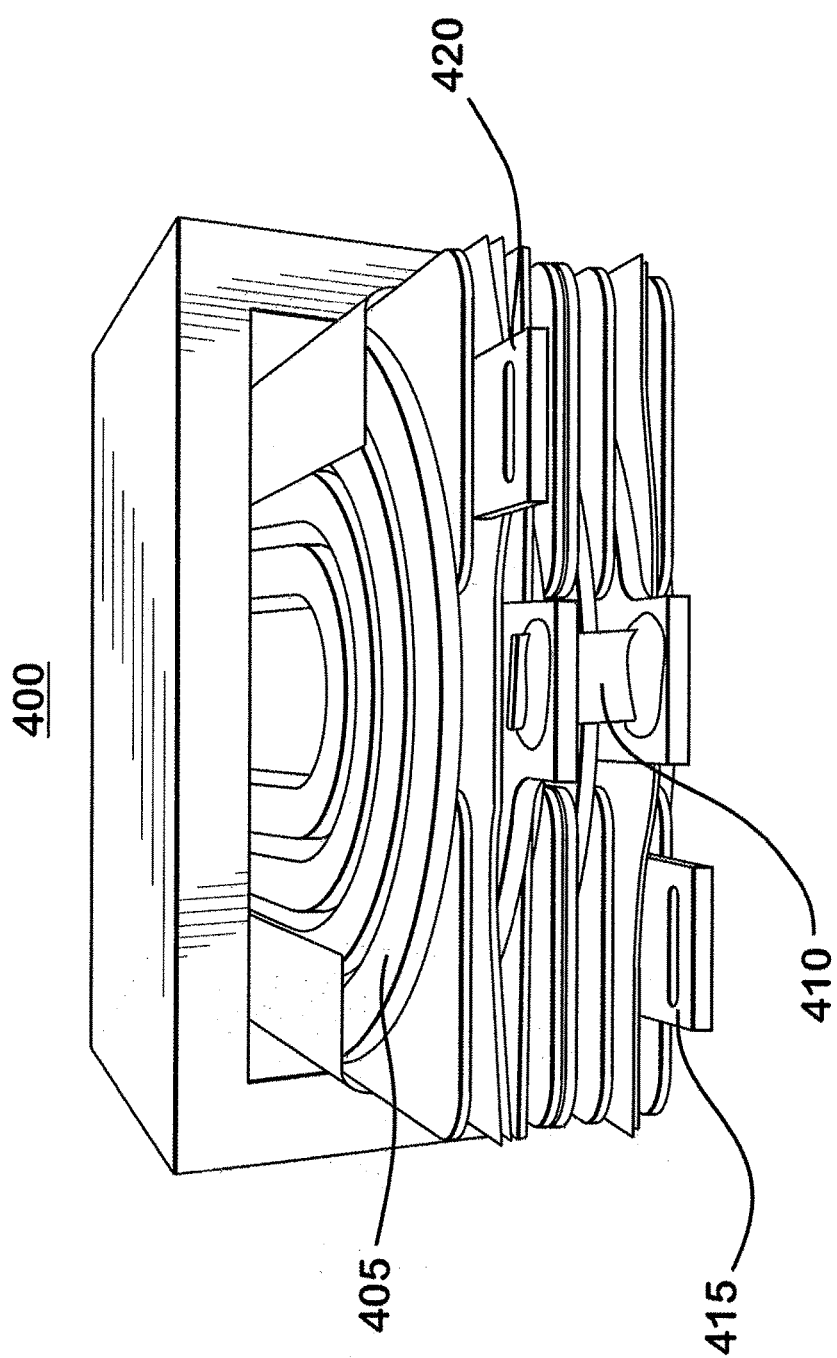
FIG. 4 shows an example of a planar transformer.

FIG. 4 shows an example of a planar transformer 400. The primary coil has terminals 415 and 420 and is made by connecting multiple planar layers with a copper slug 410. Secondary coil 405 has terminals on the back side of transformer 400 that are not shown. Secondary coil 405 is similar to that shown in FIGS. 1A and 1B but secondary coil 405 has rounded sections in its windings, as may be seen in FIG. 4, instead of only straight sections seen in FIGS. 1A and 1B. This example of a planar transformer is not to be construed as limiting; many other configurations are possible for a planar transformer.

Figure 2:
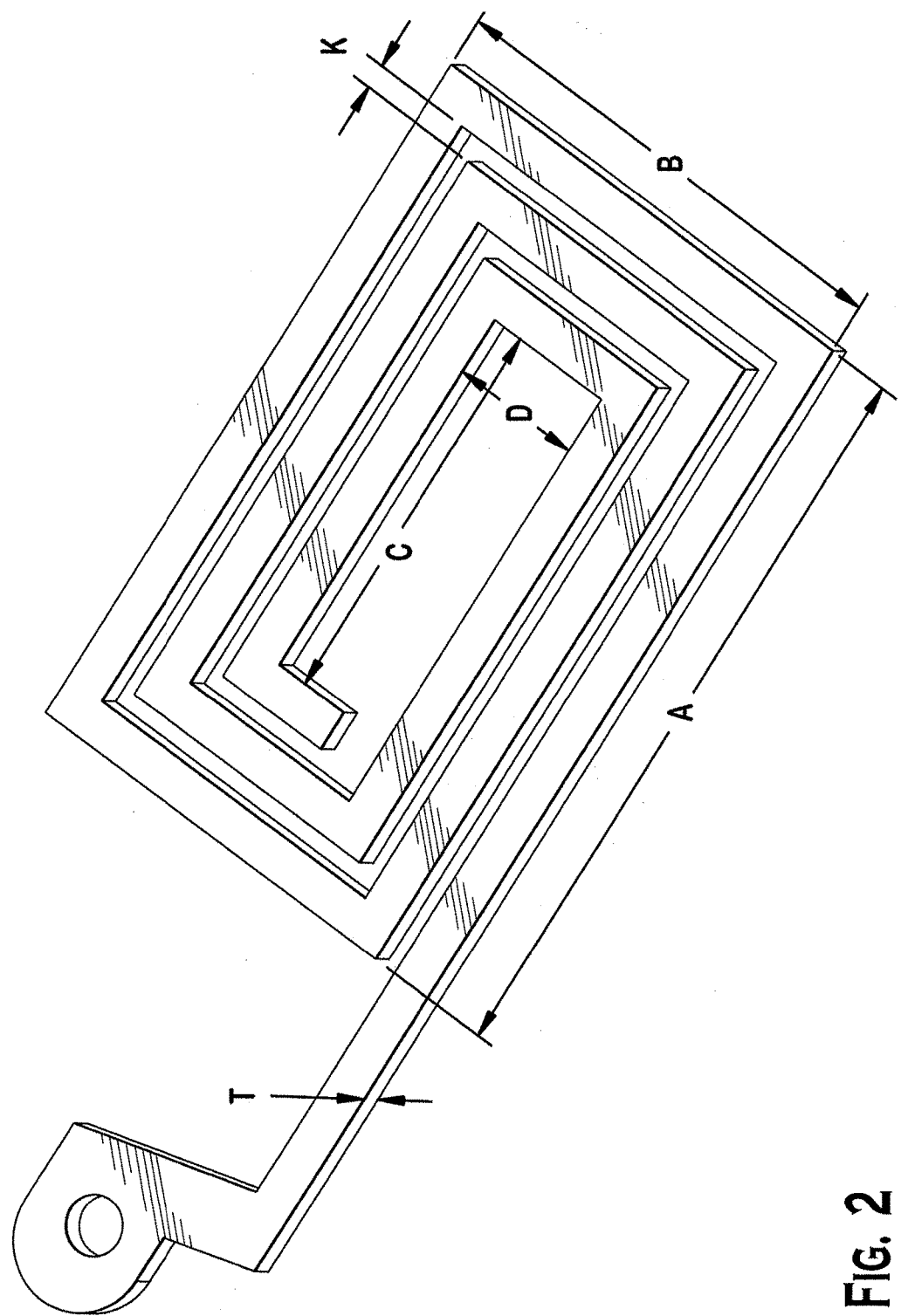
FIG. 2 shows a view of an example magnetic component fabricated using a laser cutting method or a water-jet cutting method, with some dimensions indicated.

FIG. 2 is a magnification of the coil shown in FIG. 1B. FIG. 2 indicates various dimensions of the coil, designated A, B, C, D, T, and K that can be used to describe and characterize such coils. Dimension A is an outer coil length and dimension B is an outer coil width. The total area occupied by the coil, neglecting the connecting extension, is about A×B. For certain applications, it may be desirable to reduce this area as much as possible for a given electrical characteristic such as inductance. Dimension C is an inner length and dimension D is an inner width. Dimension K is a spacing between neighboring turns. As described above, K may be as small as 0.010 inches for a coil made using a laser cutting technique as described above, or 0.015 inches by abrasive water-jet cutting, but these dimensions are not limiting. Dimension T is the thickness of the coil and, in this example, is the thickness of the single metal sheet from which the coil is cut.

Water-jet can cut roughly 24-inch thick material, depending on the material, pump horse power and jet pressure. The material can be stacked multiple inches high. The thicker the material (raw or stacked) the slower the cutting speed. Optimization can be done to balance cutting speed and stack height.

For laser cutting, depending on the output power of the laser and other factors, the approximate maximum thickness is presently about 1 inch, but this should not be considered limiting.

Increasing manufacturing throughput by stacking sheets of raw material is where water jet cutting may have an advantage over laser cutting, since a laser may weld the individual sheets to each other. As one example, it has been found that an effective method for making a 0.25 inch-thick component is to cut, using abrasive water-jet, a stack of five copper sheets, each sheet having a thickness of 0.050 inches.

Referring once again to FIG. 2, the letters C and D indicate dimensions of an inner opening of the coil. At least these quantities—A, B, C, D, K, T—may be selected to advantageously affect values of various electrical, geometrical, and mechanical characteristics of the coil. Such electrical characteristics may include inductance L, DC resistance DCR, and quality factor Q. Such geometrical and mechanical characteristics may include size and weight of the coil. As noted above, laser cutting techniques may be able to produce coils simultaneously having thicker turns and smaller spacing K between turns, relative to other cutting techniques. Increased thickness may result in larger cross-sectional areas for the coil conductor, other dimensions being held essentially constant. A larger cross section, in turn, may result in lower DCR, higher Q, and higher current carrying capacity.

Decreasing spacing K may result in greater coupling of magnetic flux and hence higher inductance. Overall, relative to other cutting techniques, laser cutting may enable the production of coils having any combination of, for example, higher inductance, lower DCR, higher Q, and better balance between stray inductance and capacitance within a given coil area or coil volume. Thus, if a design of an electronic system requires constraints on the sizes of magnetic components, a combination of relatively higher inductance, lower DCR, higher Q, and better balance between stray inductance and capacitance may be obtainable without violating those constraints. Conversely, laser cutting methods may make possible the fabrication of relatively smaller, lighter magnetic coils and other magnetic components having desired values of, or limits on, inductance, DCR, Q, and other electrical characteristics, as described and shown in the equations above.

Laser-cut components may have features that identify them as having been made using this cutting method. They may have regions that appear "burned" and regions showing small globules called "slag". Also visible are lines in the metal produced by pulses from the laser. At least one of these features commonly occurs with laser cutting methods, and is less likely to be observed with other cutting methods.

Water-jet components may have features that identify them as having been made using this cutting method. One clear signature of water-jet cutting may be a small burr on the bottom edge of a coil as well as a very granular structure on the actual cut surface. A top edge may have a slight radius where the beam of water and garnet creep over the cut edge and wear away a very small area of material.

Thus, a method for cutting magnetic components using high power lasers or using abrasive water-jet cutting has been described. Resulting magnetic components have been described. The examples presented are not to be construed as limiting.

Although the features and elements of the present invention are described in the example embodiments in particular combinations, each feature may be used alone without the other features and elements of the example embodiments or in various combinations with or without other features and elements of the present invention. Changes in the form and the proportion of parts as well as in the substitution of equivalents are contemplated as circumstances may suggest or render expedient without departing from the spirit or scope of the following claims.

What is claimed is:

1. A method of fabricating a coil structure for an inductor or a transformer comprising:
    fixing an electrically conducting planar sheet having a flat top surface and a flat bottom surface to a table, the electrically conducting planar sheet comprising a highly reflective material;
    cutting the electrically conducting planar sheet by applying the unobstructed beam of a rare-earth fiber laser directly to the sheet to form a coil having a space between neighboring turns of the coil;
    wherein the cutting is controlled by a computer configured to control movement of the table or movement the rare-earth fiber laser, and
    wherein the size of the space between neighboring turns of the coil is essentially the same diameter as the beam diameter of the laser over a region of focus of the beam.

2. The method of claim 1, wherein the space between neighboring turns is about 250 micrometers (0.010 inches) or greater.

3. The method of claim 1, wherein the electrically conducting planar sheet comprises copper or an alloy of copper.

4. The method of claim 1, wherein the space between neighboring turns is less than 250 micrometers (0.010 inches).

5. The method of claim 1, wherein the coil is formed having corners selected from either sharp or rounded.

6. The method of claim 1, further comprising including the magnetic component as a winding in an inductor or in a transformer.

7. A method of fabricating a plurality of coil structures for an inductor or a transformer comprising:
    fixing a plurality of electrically conducting planar sheets having flat top surfaces and flat bottom surfaces to a table, the electrically conducting planar sheets comprising a highly reflective material;
    arranging the plurality of electrically conducting planar sheets for simultaneous cutting by a water stream of an abrasive water-jet cutting device;
    simultaneously cutting the electrically conducting planar sheets using the water stream of an abrasive water-jet cutting device applied directly to the sheets to form a plurality of coils each having a space between neighboring turns of the coils;
    wherein the simultaneous cutting is controlled by a computer configured to control movement of the table or movement the water-jet cutting device, and
    wherein the size of the space between neighboring turns of each coil is essentially the same diameter as the diameter of the water stream.

8. The method of claim 7, wherein the space between neighboring turns is about 250 micrometers (0.010 inches) or greater.

9. The method of claim 7, further comprising the step of forming an electrical component having a coil thickness associated with the thickness of the plurality of the combined electrically conducting planar sheets.

10. The method of claim 7, wherein the electrically conducting planar sheets comprise copper or an alloy of copper.

11. The method of claim 7, comprising selecting the distance between neighboring turns of each coil to result in greater coupling of magnetic flux and higher inductance.

12. The method of claim 7, wherein the electrically conducting planar sheet is obtained from a roll.

13. The method of claim 7, further comprising including the magnetic component as a winding in an inductor or in a transformer.

14. The method of claim 1, wherein the electrically conducting planar sheet being cut comprises a plurality of sheets, and wherein the laser beam cuts the plurality of sheets simultaneously to produce multiple magnetic components.

15. The method of claim 1, wherein the diameter of the space between turns is varied by varying the beam diameter of the laser.

16. The method of claim 1, wherein the cutting is accomplished by fixing the electrically conducting planar sheet to a movable table, and controlling movement of the table via a computer-generated design stored in a computer for moving a position of the table relative to the laser.

17. The method of claim 1, wherein the cutting is accomplished by fixing the electrically conducting planar sheet to a non-moving table, and controlling movement of the laser via a computer-generated design stored in a computer for moving a position of the laser relative to the table.

18. The method of claim 7, wherein the cutting is accomplished by fixing the electrically conducting planar sheet to a movable table, and controlling movement of the table via a computer-generated design stored in a computer for moving a position of the table relative to the water jet.

19. The method of claim 7, wherein the cutting is accomplished by fixing the electrically conducting planar sheets to a non-moving table, and controlling movement of the water jet via a computer-generated design stored in a computer for moving a position of the water jet relative to the table.

20. The method of claim 7, wherein the diameter of the space between turns is varied by using water jet nozzles of different geometries.

21. The method of claim 6, wherein the magnetic component is formed separately from other components of a device that may incorporate the magnetic component.

22. The method of claim 13, wherein the magnetic component is formed separately from other components of a device that may incorporate the magnetic component.

* * * * *